J. A. PETERS.
MOTOR CYCLE.
APPLICATION FILED JAN. 12, 1922.
1,413,350.
Patented Apr. 18, 1922.
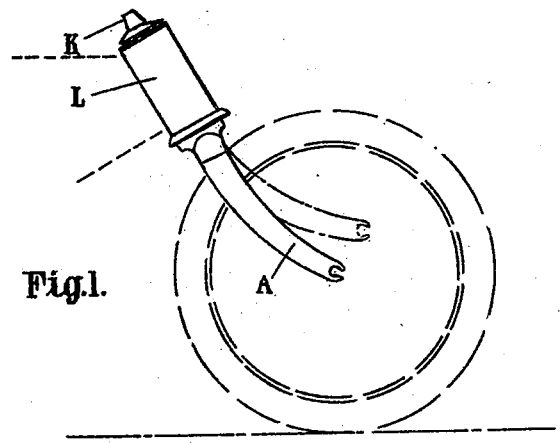
Fig.1.
Fig.2.
Fig.3.
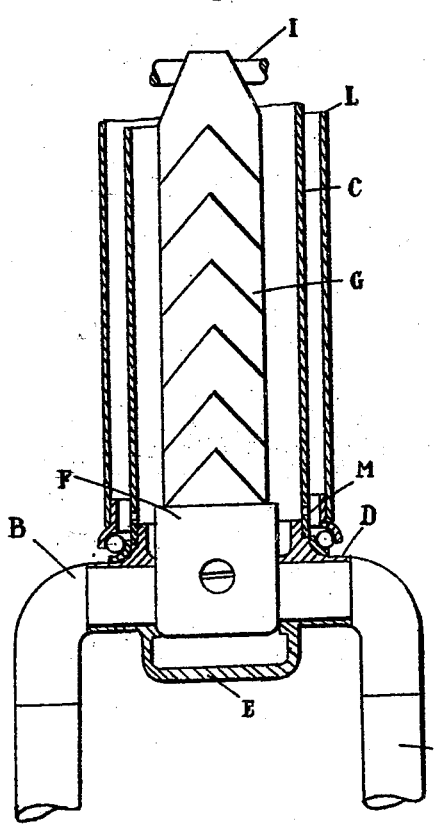
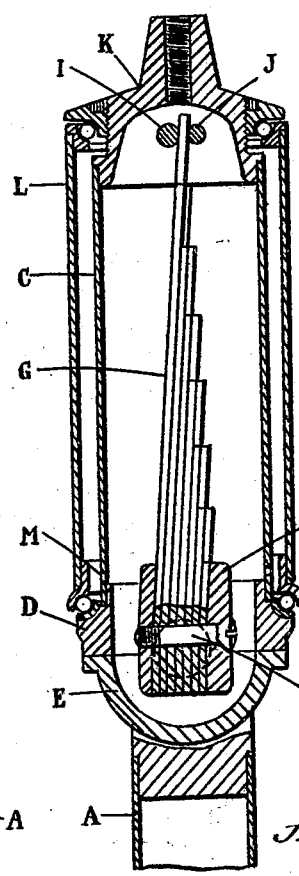
INVENTOR.
J. A. Peters

UNITED STATES PATENT OFFICE.

JAMES ARTHUR PETERS, OF THE WHITE HOUSE, NEAR SCARBOROUGH, ENGLAND.

MOTOR CYCLE.

1,413,350.  Specification of Letters Patent.  Patented Apr. 18, 1922.

Application filed January 12, 1922. Serial No. 528,680.

*To all whom it may concern:*

Be it known that I, JAMES ARTHUR PETERS, a British subject, residing at The White House, near Scarborough, in the county of Yorkshire, England, have invented certain new and useful Improvements in Motor Cycles, (for which I have filed a British application October 21, 1920, No. 29,790,) of which the following is a specification.

This invention comprises an improved method of springing a wheel carried in a steerable fork of a bicycle, tricycle, motorcycle, cycle-car or the like, and has for its object to hingedly mount the said fork at the base of the steering-head so as to permit the said fork to rock about an axis parallel to the wheel axle, the rocking movement being resisted by a leaf spring contained within the steering-head. The invention further consists in means for lubricating the said springing mechanism.

The preferred form of the invention is illustrated in the accompanying drawing in which Fig. 1 illustrates the general arrangement as applied to the front wheel of a motorcycle, Figs. 2 and 3 being sectional elevations of the springing mechanism viewed respectively at right angles to the plane of the wheel and in the plane thereof.

Referring now to the drawing, the wheel axle is held in the usual forked arms A brazed to the fork crown B which is pivotally mounted so as to be able to rock relatively to the steering-head C about an axis parallel to the axle. For this purpose the steering-head is fitted with a half-bearing D to which is detachably secured by means of bolts or the like a steering-head cap E forming a second half-bearing so as to provide a journal for the shaft of the fork crown B.

The shaft of the fork crown is formed centrally with a socket F adapted to house the butt end of a compound leaf spring G. In order to facilitate insertion, one or more of the leaves are formed at the lower end with a slight taper; and all the leaves are held firmly in place by a transverse screw H. The spring extends up the steering-head and is engaged at its upper end by a bearing-pin I and recoil-pin J fitted in the steering-head cap K.

It will be seen therefore that movement of the wheel axle into the position shown in dotted lines in Fig. 1 is resisted by the leaf spring abutting against the bearing-pin I and excessive recoil of the said spring by the recoil-pin J. The cap K is coned to receive a handle-bar fitting; and both the bearing D and cap K are provided with coned ball-races corresponding with similar ball-races provided in the frame tube L in which the steering-head is mounted.

The steering-head is intended to be filled with grease for lubricating the leaves of the spring G and the bearing of the fork crown B, and the perforations M are provided near its base to permit of the lubricant also reaching the lower ball-race.

I claim:—

1. Means for springing a vehicle wheel carried in a steerable-fork comprising a hollow steering-head, a fork hingedly mounted at the base of said steering-head so as to permit the said fork to rock about an axis parallel to the wheel axis and a leaf spring contained within and in line with said steering-head and so disposed as to resist the rocking movement of the fork.

2. Means for springing the axle of a vehicle steering-wheel comprising forks carrying said axle, a hollow steering-head, a shaft carrying said forks and rotatably mounted at the foot of the steering-head a fixed member mounted in the upper part of the steering-head and a leaf spring rigidly attached to said shaft, extending up and in line with the steering-head and abutting against said fixed member so as to support the load on said axle.

3. Means for springing the axle of a vehicle steering-wheel comprising a steering head, a fork carrying said axle and hingedly mounted at the base of said steering head so as to be adapted to rock about a horizontal transverse axis and a leaf spring substantially above and in line with said fork and arranged to resist upward movement of said axle, said steering head being hollow and adapted to contain said leaf spring and a supply of lubricant therefor.

4. Means for springing a vehicle wheel carried in a steerable-fork comprising a hollow steering-head, a fork hingedly mounted at the base of said steering-head so as to permit the said fork to rock about an axis parallel to the wheel axis, a leaf spring rigidly mounted at its lower end in relation to said fork and contained within and in line with said steering head, an abutment at the back of the top end of said spring and an abutment at the front of the top end of said spring.

5. Means for springing the axle of a vehicle steering wheel comprising a steering head, a fork carrying said axle and hingedly mounted at the base of said steering head so as to be adapted to rock about a horizontal transverse axis and a leaf spring substantially above and in line with said fork and arranged to resist upward movement of said axle, and an enclosing sheath adapted to contain lubricant for the hinged mounting and the spring.

6. The combination with a steerable fork of a motor cycle of a hollow head, means whereby the fork is pivotally mounted at the base of the head to permit a rocking movement of the fork about an axis parallel to the wheel axis, a steering head member in which the fork is rotatably mounted, a leaf spring secured to the fork pivoting means within said member, and means in the upper end of said fork to engage and limit free movement of the spring in either direction.

7. The combination with a hollow steering head of a motor cycle of a wheel fork, a bearing member forming part of said head in which the fork is pivotally mounted to permit said fork to rock about an axis parallel to the wheel axis, a leaf spring rigidly secured within said member and with respect to the fork, and means at the upper end of the head to limit movement of the spring in rocking movement of the fork in either direction.

In testimony whereof I affix my signature.

JAMES ARTHUR PETERS.